United States Patent Office 3,631,210
Patented Dec. 28, 1971

3,631,210
PROCESS FOR THE SELECTIVE HYDROGENATION OF CYCLODODECATRIENE TO CYCLODODECENE
Michael Tuttle Musser, Wilmington, Del., assignor to E. I. du Pont de Nemours and Company, Wilmington, Del.
No Drawing. Filed Aug. 7, 1970, Ser. No. 62,204
Int. Cl. C07c 5/14, 5/16
U.S. Cl. 260—666 A 6 Claims

ABSTRACT OF THE DISCLOSURE

An improved process for the selective hydrogenation of 1,5,9-cyclododecatriene to cyclododecene in the presence of a nickel halide complexed with a trihydrocarbyl phosphine which comprises carrying out the hydrogenation with at least a 2 molar excess of the phosphine and at a hydrogen pressure in the order of 65–150 atmospheres.

BACKGROUND OF THE INVENTION

The selective hydrogenation of 1,5,9-cyclododecatriene to cyclododecene with a catalyst of a nickel halide complexed with a trihydrocarbyl phosphine is described and claimed in U.S. Pat. 3,499,050. The process of the present invention provides a method for obtaining still higher yields, a feature which is of great importance, particularly in large scale manufacturing processes.

The cyclododecene can be oxidized to dodecanedioic acid which in turn is a valuable chemical in the production of polyamide and polyester resins, surface active agents and the like.

SUMMARY OF THE INVENTION

The invention resides in the discovery that improved yields of cyclododecene are realized in the hydrogenation of 1,5,9-cyclododecatriene in the presence of a nickel halide complexed with a trihydrocarbyl phosphine by carrying out the hydrogenation with an excess of the trihydrocarbyl phosphine and under a hydrogen pressure of about 65 atmospheres to 150 atmospheres. The excess of the trihydrocarbyl phosphine is about 2 moles to 5 moles. The reaction may be carried out at a temperature in the range of 25 to 250° C.

The catalysts for the hydrogenation have the formula $(R_3P)_2NiX_2$ wherein R is a hydrocarbyl radical having from 1 to 9 carbon atoms and free of aliphatic unsaturation or R is substituted hydrocarbyl comprising an aromatic ring with a substituent of a halogen or lower alkoxyl group and having a total of 6–9 carbon atoms and X is halogen having an atomic number of at least 17. In general the R groups are the same for convenience of preparation but compounds containing mixed R groups are operable and can be used as catalysts in the process of the present invention.

Typical R groups consisting of simple hydrocarbyl radicals include methyl, ethyl, n-propyl, isopropyl, n-butyl, t-butyl, 2-ethylhexyl, n-octyl, 2-methyloctyl, cyclopentyl, cyclohexyl, 4-ethycyclohexyl, benzyl, 4-methylbenzyl, 3, 4-dimethylbenzyl, phenyl, tolyl, 2,4-dimethylphenyl, 2,4, 5-trimethylphenyl, 4-n-propyl phenyl and the like. R groups consisting of aromatic radicals with a halogen or alkoxy substituent include 4-fluorophenyl, 4-chlorophenyl, 4-bromophenyl, 4-iodophenyl, 3-chlorophenyl, 3-chloro-4-methylphenyl, 3-propyl-4-fluorophenyl, 3,5 - dimethyl - 4 - bromophenyl, 4-bromobenzyl, 3-methyl-4-chlorobenzyl, 4-methoxyphenyl, 4-ethoxybenzene, 3-methoxy-4-methylphenyl and the like.

The halogen atoms X attached to nickel in the catalyst can be chlorine, bromine or iodine, i.e., a halogen with an atomic number of at least 17. The iodides are preferred in that somewhat higher yields of product are obtained with them.

The reaction may be carried out in the absence of any diluent or the 1,5,9-cyclododecatriene may be diluted with a solvent inert to the catalyst and the reactants if desired. Suitable solvents include benzene and benzene substituted with one or more lower alkyl groups such as toluene, xylenes or ethyl benzenes. Mixtures of solvents may be employed if desired.

The 1,5,9-cyclododecatriene may be made by the trimerization of butadiene following the procedures described by G. Wilke et al. Angew Chem. 71 574(1959) or by H. Tokahasi and M. Yamaguchi, J. Oreg Chem. 28 1409(1963). The bis(triphenylphosphine)nickel dihalides may be prepared by the method described by L. M. Venanzi, J. Chem. Soc. 719(1958).

DESCRIPTION OF PREFERRED EMBODIMENTS

In the preferred embodiment of this invention the catalyst is a nickel iodide complexed with triphenylphosphine. The preferred excess in amount of the triphenylphosphine is about 2 to 3 moles. The preferred temperature for carrying out the reaction is in the range of 120–150° C. and preferred hydrogenation pressure is in the range of 70 to 100 atmospheres. The preferred embodiments are more fully illustrated in the examples to follow.

EXAMPLE 1

One gram of bis-(triphenylphosphine) nickel diiodide (0.0012 mole), 0.62 g. (0.0024 mole) of triphenylphosphine and 40 ml. of 1,5,9-cyclododecatriene are placed in a stainless steel pressure tube. The tube is closed and hydrogen is admitted to a pressure of approximately 80 atmospheres. The tube is heated to approximately 132° C. and maintained at approximately that point and at or near 80 atmospheres hydrogen pressure for a period of six hours. The reaction product is a clear colorless liquid containing no solids. Analysis of the product by gas chromatography gives the following results in terms of area percent: cyclodedcane—0.1%; trans-cyclododecene—63.7% cis-cyclododecene—35.9%; trans,trans,trans-cyclododecatriene—0.2%. The total trans and cis cyclododecene yield amounts to 99.9%. The corresponding yield of cis and trans cyclododecene obtained in hydrogenation run with no added triphenylphosphine is 96.3%. The gas chromatography was done on a column containing butanediol succinate as the liquid phase, 10% on 100/120 mesh Gas Chrome RA (a crushed fire brick from Applied Science, Inc.), under isothermal operation at 172° C. with a gas flow of 13 cc./min. of helium.

EXAMPLE 2

The procedure followed in this example is the same as that described under Example 1 with respect to the amount of starting materials, catalysts and hydrogen pressure, except that varying amounts of the triphenylphosphine are introduced into the reactor. The effect of the varying amounts of triphenylphosphine on the yield of cyclododecene obtained is shown in tabular form below.

EFFECT OF TRIPHENYL PHOSPHINE ON YIELD OF CYCLODODECENE

None:[1]
- Percent conversion _____ 97.9
- Percent yield _____ 96.3

1 mole:[1]
- Percent conversion _____ 97.0
- Percent yield _____ 94.4

2 moles:[1]
- Percent conversion _____ 99.8
- Percent yield _____ 99.9

4 moles:[1]
- Percent conversion _____ 97.6
- Percent yield _____ 98.5

[1] Amount of triphenyl phosphine added (based on moles of catalyst).

The conversion figure is based on the amount of 1,5,9-cyclododecatriene converted; the percent yield refers to the yield of cyclododecene comprising cis and trans cyclododecene found in the crude reaction product by vapor phase chromatography, carried out as described in Example 1.

Improvement in conversion and yield through use of added trihydrocarbyl phosphine is not observed at a hydrogen pressure of 40 atmospheres.

I claim:

1. In a process for hydrogenating 1,5,9-cyclododecatriene to cyclododecene by contacting 1,5,9-cyclododecatriene with hydrogen in the presence of a catalytic amount of a catalyst having the formula $(R_3P)_2NiX_2$ wherein R is a hydrocarbyl radical of 1 to 9 carbon atoms free of aliphatic unsaturation or R is a substituted hydrocarbyl radical free of aliphatic unsaturation, the substituted hydrocarbyl group comprising an aromatic ring with a substituent of a halogen atom or a lower alkoxyl group and having a total of 6–9 carbon atoms, X is halogen having an atomic number of at least 17 at a temperature of 25–250° C. and recovering cyclododecene from the product of the reaction, the improvement wherein the hydrogenation is carried out in the presence of the catalyst $(R_3P)_2NiX_2$ and an amount of a compound of the formula $R_3P$ in a molar ratio of from 2 to 5 with respect to the molar amount of the catalyst and at a hydrogen pressure of about 65 to 150 atmospheres.

2. The process of claim 1 wherein the temperature is in the range of 120–150° C.

3. The process of claim 2 wherein R is phenyl.

4. The process of claim 3 wherein X is iodine.

5. The process of claim 1 wherein the hydrogen pressure is in the range of 70 to 100 atmospheres.

6. The process of claim 1 wherein the molar ratio of $R_3P$ to catalyst is 2 to 3.

References Cited

UNITED STATES PATENTS 3,499,050   3/1970   Gosser _____ 260—666 A

DELBERT E. GANTZ, Primary Examiner

V. O'KEEFE, Assistant Examiner